United States Patent
Bullard et al.

(10) Patent No.: US 11,869,071 B1
(45) Date of Patent: Jan. 9, 2024

(54) RAPID AND EFFICIENT CASE OPENING FROM NEGATIVE NEWS

(71) Applicant: Wells Fargo Bank, N.A., San Francisco, CA (US)

(72) Inventors: Angelica Bullard, Oakland, CA (US); Mauricio Flores, Oakland, CA (US); Ian Kloville, San Francisco, CA (US); Jeremy Norvell, Livermore, CA (US); Sameer Shetty, Concord, NC (US); Michael Traverso, Chicago, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 409 days.

(21) Appl. No.: 16/712,578

(22) Filed: Dec. 12, 2019

Related U.S. Application Data

(63) Continuation of application No. 16/711,951, filed on Dec. 12, 2019, now Pat. No. 11,431,519.

(51) Int. Cl.
```
G06Q 40/00      (2023.01)
G06Q 40/02      (2023.01)
G06N 20/00      (2019.01)
G06Q 40/12      (2023.01)
```
(52) U.S. Cl.
CPC .............. *G06Q 40/02* (2013.01); *G06N 20/00* (2019.01); *G06Q 40/12* (2013.12)

(58) Field of Classification Search
CPC ......... G06Q 40/02; G06Q 40/12; G06N 20/00
See application file for complete search history.

(56) References Cited

U.S. PATENT DOCUMENTS

| 8,095,441 B2 | 1/2012 | Wu et al. |
| 10,163,158 B2 | 12/2018 | Song et al. |
| 2009/0125369 A1 | 5/2009 | Kloostra et al. |

(Continued)

OTHER PUBLICATIONS

"Case Study—AML Operations", https://www.crisil.com/content/dam/crisil/our-businesses/global-research-and-analytics/risk-and-analytics/financial-crime-analytics-capabilities/case-study/aml-operations.pdf 2017. 4 pages.

(Continued)

*Primary Examiner* — Peter Ludwig
*Assistant Examiner* — Reva R Moore
(74) *Attorney, Agent, or Firm* — Foley & Lardner LLP

(57) ABSTRACT

Disclosed is an example approach in which news alerts are scanned in real-time or near real-time, relevant alerts identified through a topic extraction model, and associated actors identified through an entity extraction model. An entity resolution model may be applied to determine which actors are clients. The topic extraction, entity extraction, and/or entity resolution models may apply, for example, natural language processing models. The alert may be enriched by being packaged with client and transactional data to generate an enriched alert. A predictive model may be applied to the enriched alert to identify events with a high probability of law enforcement referral, and the enriched alert may be automatically transmitted to certain identified devices. The predictive model is trained using a combination of news alerts and data on clients and transactions, yielding enhanced predictions. The disclosed approach reveals relevant underlying associations and connections between entities and transactions not otherwise feasibly discoverable.

20 Claims, 7 Drawing Sheets

(56) References Cited

U.S. PATENT DOCUMENTS

| | | |
|---|---|---|
| 2010/0004981 A1 | 1/2010 | Katz et al. |
| 2011/0055072 A1 | 3/2011 | Lee et al. |
| 2013/0061179 A1 | 3/2013 | Alletto et al. |
| 2014/0074737 A1 | 3/2014 | Dickenson et al. |
| 2014/0095417 A1 | 4/2014 | Herz et al. |
| 2015/0199688 A1* | 7/2015 | Sulur ................ G06Q 20/4016 |
| | | 705/39 |
| 2016/0155126 A1 | 6/2016 | D'Uva |
| 2016/0371618 A1* | 12/2016 | Leidner ............. G06Q 10/0635 |
| 2017/0223046 A1 | 8/2017 | Singh |
| 2018/0219875 A1 | 8/2018 | Bania et al. |
| 2019/0096215 A1 | 3/2019 | Shahid et al. |
| 2019/0114554 A1 | 4/2019 | Chen et al. |
| 2019/0259033 A1* | 8/2019 | Reddy ...................... G06N 5/02 |
| 2020/0067969 A1 | 2/2020 | Abbaszadeh et al. |
| 2020/0258181 A1 | 8/2020 | Song et al. |
| 2020/0311736 A1 | 10/2020 | Song et al. |

OTHER PUBLICATIONS

Breslow et al., "The new frontier in anti-money laundering", McKinsey & Company, Nov. 2017. 10 pages.

Kumar, Anjani; "To Truly Transform KYC and AML Operations Adopt AL and ML", Sep. 11, 2017. 5 pages.

* cited by examiner

… (1)

RAPID AND EFFICIENT CASE OPENING FROM NEGATIVE NEWS

CROSS REFERENCE TO RELATED APPLICATION

This application is a continuation of U.S. patent application Ser. No. 16/711,951 entitled "RAPID AND EFFICIENT CASE OPENING FROM NEGATIVE NEWS," filed Dec. 12, 2019, and incorporated herein by reference in its entirety.

TECHNICAL FIELD

The present disclosure relates to application of machine learning to news alerts for more rapid identification of persons and organizations of interest for investigation in relation to crimes and suspicious activities with a financial component.

BACKGROUND

It would be useful to identify, before an investigation, persons and organizations who are potentially involved in financial crimes or suspicious activities. Some actors who are involved in suspicious activities may appear in news alerts regarding suspected or actual financial or non-financial crimes, or may be associated with or related to others involved in financial or non-financial crimes. For example, news of a standoff or chase between police and a suspect may reveal actors (e.g., the suspect or someone associated with or related to the suspect, whether named or not named in a news report) who may be engaged in suspicious activities that warrant further investigation.

SUMMARY

Various embodiments of the disclosure relate to a machine-learning method implemented by an entity computing system of an entity, such as a financial institution computing system of a financial institution. The method may comprise monitoring a plurality of news sources, which may generate a set of news alerts, to detect a subset of news alerts satisfying a criterion (via, e.g., a topic extraction model). The method may comprise applying an entity extraction model to the subset of news alerts to identify a set of persons or organizations associated with the criterion. The method may comprise determining (via, e.g., an entity resolution model) that one or more of the persons or organizations in the set of persons or organizations is a client of the entity, such as a customer of the financial institution. The method may comprise generating an enriched alert comprising client data and one or more of the news alerts in the subset of news alerts. The method may comprise applying a predictive model to determine a probability that the enriched alert will trigger a suspicious activity report. Alternatively or additionally, the method may comprise applying the predictive model to generate a prediction as to whether the enriched alert is likely to trigger a suspicious activity report. The method may comprise determining that the probability is greater than a threshold probability. Alternatively or additionally, the method may comprise determining that the prediction indicates that the enriched alert is likely to trigger a suspicious activity report. The method may comprise applying a relevance model to identify a destination computing device. The relevance model may be applied in response to determining that the probability is greater than the threshold. Alternatively or additionally, the relevance model may be applied in response to determining that the prediction indicates that the enriched alert is likely to trigger a suspicious activity report. The method may comprise transmitting the enriched alert to the identified destination computing device.

In one or more embodiments, monitoring the plurality of news sources may comprise monitoring the plurality of news sources in real time. The plurality of news sources may be monitored by accessing multiple third-party devices. The news alerts may include audiovisual alerts. The news alerts may, additionally or alternatively, include written alerts. Applying the entity extraction model may produce a first person or organization named in the subset of news alerts. The entity extraction model may alternatively or additionally produce a second person or organization who is not named in the subset of news alerts. The second person or organization may be related to the first person or organization. The client may be the first person or organization, or alternatively, the client may be the second person or organization. The first person or organization and the second person or organization may be related by having engaged in one or more financial transactions with each other. The first person or organization and the second person or organization may be related by being in a same family. The first person or organization and the second person or organization may be related by being involved in a same commercial enterprise. Generating the enriched alert may comprise retrieving client data from one or more internal databases. The criterion may be commission of a crime.

Various embodiments of the disclosure relate to an entity computing system of an entity. The computing system may comprise a processor and a memory comprising instructions executable by the processor. The instructions may comprise a machine learning platform. The machine learning platform may be configured to monitor a plurality of news sources, which may generate a set of news alerts, to detect a subset of news alerts satisfying a criterion. The machine learning platform may be configured to apply an entity extraction model to the subset of news alerts to identify a set of persons or organizations associated with the criterion. The machine learning platform may be configured to determine that one or more of the persons or organizations in the set of persons or organizations is a client of the entity. The machine learning platform may be configured to generate an enriched alert comprising client data and one or more news alerts in the subset of news alerts. The machine learning platform may be configured to apply a predictive model to determine a probability that the enriched alert will trigger a suspicious activity report, and/or to generate a prediction as to whether the enriched alert is likely to trigger a suspicious activity report. The machine learning platform may be configured to determine that the probability is greater than a threshold probability, and/or to determine that the prediction indicates that the enriched alert is likely to trigger a suspicious activity report. The machine learning platform may be configured to apply a relevance model to identify a destination computing device. The machine learning platform may be configured to apply the relevance model in response to determining that the probability is greater than the threshold, and/or in response to determining that the prediction indicates that the enriched alert is likely to trigger a suspicious activity report. The machine learning platform may be configured to transmit the enriched alert to the identified destination computing device.

In one or more embodiments, the machine learning platform may be configured to access multiple third-party devices to monitor the plurality of news sources in real time.

The machine learning platform may be configured to monitor audiovisual news alerts and/or written news alerts. The machine learning platform, by applying the entity extraction model, may be configured to produce a first person or organization named in the subset of news alerts, and/or a second person or organization who is not named in the subset of news alerts but who is related to the first person or organization. The client may be the first person or organization or the second person or organization. The first person or organization and the second person or organization may be related by having engaged in one or more financial transactions with each other. The machine learning platform may be configured to identify the subset of news alerts by applying natural language processing models to the set of news alerts.

Various embodiments of the disclosure relate to a machine-learning method implemented by a computing system of a financial institution. The method may comprise retrieving one or more news alerts from one or more third-party devices. The method may comprise applying an entity extraction model to the one or more news alerts to identify one or more persons or organizations that are customers of the financial institution. The method may comprise generating an enriched alert comprising customer data and the one or more news alerts or a subset of the news alerts. The method may comprise applying a predictive model to determine that the enriched alert is sufficiently likely to trigger a suspicious activity report once investigated. The method may comprise identifying a destination computing device. The destination computing device may be identified in response to determining that the enriched alert is sufficiently likely to trigger the suspicious activity report. The method may comprise transmitting the enriched alert to the identified destination computing device for investigation.

In one or more embodiments, the method may comprise applying a topic extraction model to the one or more news alerts to identify one or more topics of the news alerts. Applying the topic extraction model may comprise applying natural language processing models to the one or more news alerts to identify the one or more topics. Applying the predictive model may comprise determining that at least one of the topics satisfies a criterion. The criterion may be commission of a crime. The crime may be a financial crime.

In one or more embodiments, applying the predictive model may comprise applying a topic model to the one or more topics to determine a significance metric for the one or more topics. The significance metric may correlate with relevance of the one or more topics to potential investigations. Identifying the destination computing device may comprise identifying a first computing device if the significance metric is at least as large as a threshold significance metric. Identifying the destination computing device may comprise identifying a second computing device if the significance metric is smaller than the threshold significance metric.

In one or more embodiments, retrieving the one or more news alerts may comprise monitoring the third-party devices in real-time for news alerts satisfying a criterion, and acquiring the news alerts that satisfy the criterion.

In one or more embodiments, applying the entity extraction model may produce a first person or organization who is named in the one or more news alerts. Alternatively or additionally, applying the entity extraction model may produce a second person or organization who is not named in the one or more news alerts but who is related to the first person or organization. The customer may be the first person or organization. The customer may be the second person or organization.

In one or more embodiments, applying the predictive model may comprise applying a subject model to the customer data to determine that the customer warrants an investigation. The customer may be determined to warrant an investigation based on the customer's association with one or more other persons or organizations of interest. Alternatively or additionally, the customer may be determined to warrant an investigation based on financial transactions involving the customer.

In one or more embodiments, the customer data in the enriched alert may comprise personally identifying data and/or financial transactions involving the customer. Applying the predictive model may comprise applying a subject model to the customer data to determine that financial transactions involving the customer warrant an investigation.

In one or more embodiments, the method may comprise training the predictive model via machine learning using past enhanced alerts. The machine learning may be supervised machine learning. The machine learning may, alternatively or additionally, be unsupervised machine learning. The past enhanced alerts may be past enhanced reports for which outcomes are known. The outcomes may include whether an investigation was conducted and/or whether a suspicious activity report was triggered upon investigation.

Various embodiments of the disclosure relate to a computing system of a financial institution. The computing system may comprise a processor and a memory comprising instructions executable by the processor, the instructions comprising a machine learning platform. The computing system may be configured to retrieve one or more news alerts. The news alerts may be retrieved from one or more third-party devices. The computing system may be configured to apply an entity extraction model to the one or more news alerts to identify one or more persons or organizations that are associated with (e.g., that are named in the news alert, or that are not explicitly named but are nonetheless related to a named entity) the news alerts. The computing system may be configured to determine which persons or organizations are customers of the financial institution (via, e.g., an entity resolution model). The computing system may be configured to generate an enriched alert comprising customer data and the one or more news alerts or a subset thereof. The computing system may be configured to apply a predictive model to determine that the enriched alert is sufficiently likely to trigger a suspicious activity report following an investigation. The computing system may be configured to identify a destination computing device in response to determining that the enriched alert is sufficiently likely to trigger the suspicious activity report. The computing system may be configured to transmit the enriched alert to the identified destination computing device for investigation.

In one or more embodiments, the computing system may be configured to apply a topic extraction model to the one or more news alerts to identify one or more topics of the news alerts. Applying the topic extraction model may comprise applying natural language processing models to the one or more news alerts to identify the one or more topics.

In one or more embodiments, applying the predictive model may comprise applying a topic model to the one or more topics to determine a significance metric for the one or more topics. Identifying the destination computing device may comprise identifying a first computing device if the significance metric is at least as large as a threshold significance metric, and a second computing device if the significance metric is smaller than the threshold significance metric. Alternatively or additionally, applying the predictive model may comprise applying a subject model to the customer data to determine that the customer warrants an investigation. The customer may be determined to warrant an investigation based on the customer's association with one or more other persons or organizations of interest. Alternatively or additionally, the customer may be determined to warrant an investigation based on financial transactions in which the customer was involved.

In one or more embodiments, the computing system may be configured to train the predictive model via machine learning using past enhanced alerts. The machine learning may be supervised machine learning. The machine learning may, alternatively or additionally, be unsupervised machine learning. The past enhanced alerts may be past enhanced reports for which outcomes are known. The outcomes may include whether an investigation was conducted and/or whether a suspicious activity report was triggered upon investigation.

These and other features, together with the organization and manner of operation thereof, will become apparent from the following detailed description and the accompanying drawings.

DETAILED DESCRIPTION

Figure 1A:
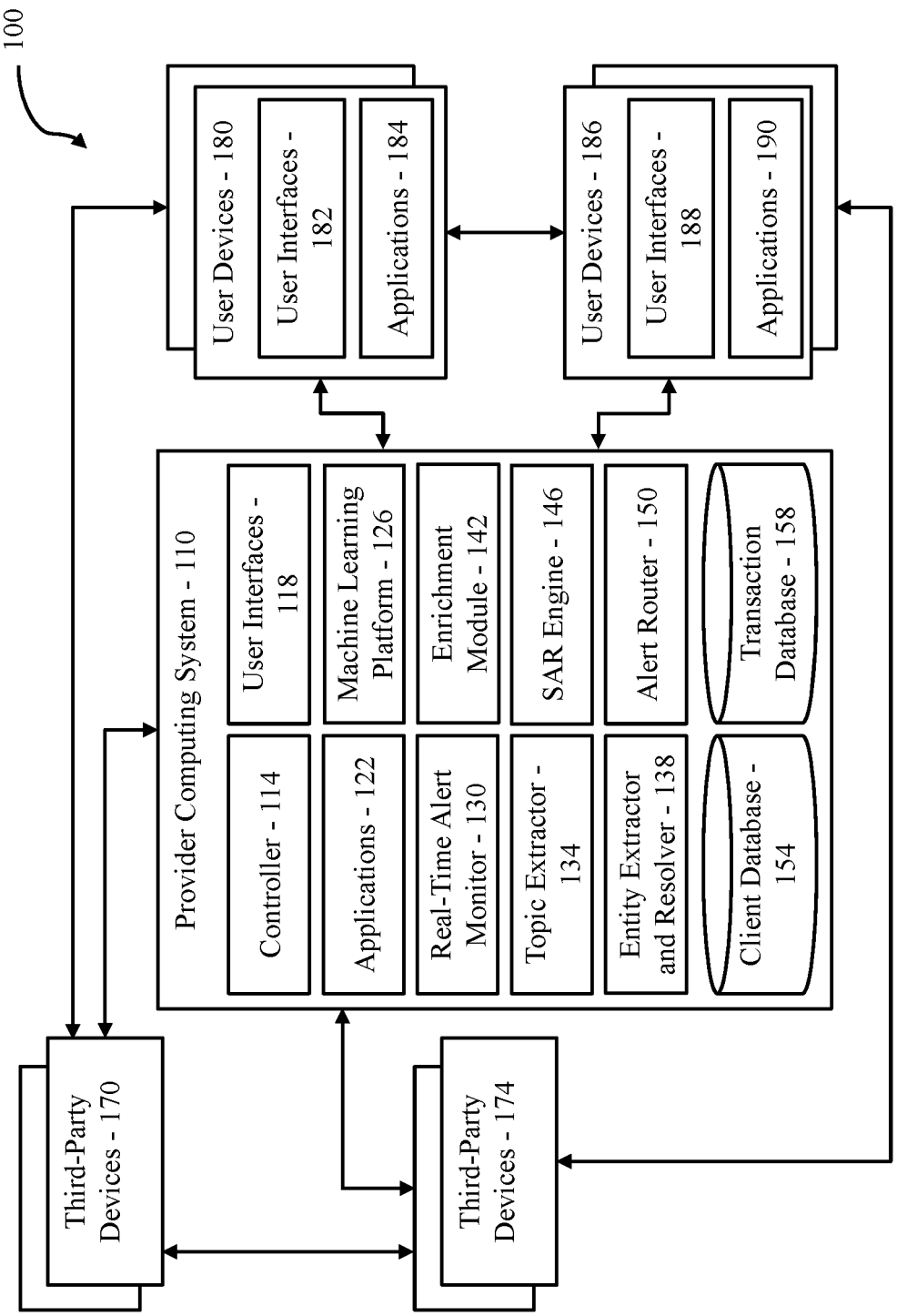
FIG. 1A is a block diagram of a provider computing system that implements a machine learning platform and that communicates with third-party devices and user devices, according to potential embodiments.

A suspicious activity report (SAR) may be generated by a financial institution to inform a regulatory or law enforcement agency of suspicious or potentially suspicious activity. Such reports may be triggered by, for example, financial transactions that appear unusual or are apparently inexplicable, that are potentially related to a crime, or that are performed by certain persons of interest. Often, certain persons or organizations may be named in a news alert, or related to persons or organizations named in news alerts, and the activities being reported on (which may be financial or non-financial in nature) may have a financial component that warrants investigation and potentially a suspicious activity report. Knowledge of the financial components may be useful to investigators and may assist regulatory and law enforcement efforts, such as preventing ongoing or future crimes. The sooner such financial information is unearthed, the more useful, valid, and relevant the information is to investigators, law enforcement, and regulators.

Described herein are methods and systems for applying machine learning to analysis of news alerts to reveal hidden connections to more effectively and efficiently identify events and activities that may warrant investigation. A machine learning platform trains and uses models to identify "bad" persons or organizations in news alerts from various news sources and determine whether the persons or organizations are customers. The system may enrich the news alerts with customer data (e.g., personal data), account data (e.g., financial transactions or transaction summaries), related party data (e.g., data on family, employers, business partners), past suspicious activity reports or information on related investigations (which may have concluded or may be ongoing), risk overviews, or other relevant "risk of customer" data. The enriched data may then be used by the machine learning platform to predict the probability that the reported events, in light of what else is known about the persons or entities involved, such as financial transactions and relationships (e.g., purchasing items used in the commission of a crime, transactions engaged in with suspects or other persons of interest, relationship with a suspected entity or person or interest, etc.), will trigger a law enforcement referral. The platform will also predict the likely significance or priority of that law enforcement referral (e.g., how consequential the events are) and then, based on the prediction, may transmit the case to an appropriate computing device of a suitable investigator.

The machine learning platform may employ a variety of machine learning techniques in classification and pattern recognition of data to determine normal patterns in data and to identify unusual outlier data points. For example regression algorithms may also be used to decide which data points are the most important causal factors that drive certain results. Decisioning algorithms which may drive the system to analyze situations to decide what the best course of action may be based on the available options. Clustering algorithms may also be employed, such as in situations when it is uncertain how to classify a result or dataset, to classify the result in a specific category for being within a specific distance to a cluster of other data points.

In various embodiments, values in a set can be categorized using a k-means clustering algorithm that is unsupervised, with no dependent variable associated therewith. Alternatively or additionally, other approaches can be used to detect a sequence or pattern of behavior. For example, long short term memory (LSTM) recurrent neural networks (RNNs), gradient boosted trees, logistic regression, hidden and basic Markov models, and frequent pattern growth algorithms may be utilized in classifying patterns and decisions while training the various machine-learning models discussed herein.

In some embodiments, clusters may be developed using, for example, Python, SAS, R, Spark and/or H20. In certain versions, k-means clustering may be developed using the SAS FASTCLUS procedure, which performs a disjoint cluster analysis on the basis of distances computed from one or more quantitative variables. The observations may be divided into clusters such that every observation belongs to one and only one cluster. The clusters do not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved. Multiple machine learning techniques may be employed, in turn or in parallel, in training and applying the machine learning models discussed herein.

In example embodiments, the approach involves real-time or near real-time scanning of the news and identification of "bad" actors (via, e.g., an entity extraction model) through natural language processing (NLP) models, application of an entity resolution model to determine which actors are customers, packaging of alert, entity, and transaction data, application of predictive modeling to identify "important" events with a high probability of a law enforcement referral, and automated transmission to certain identified devices. Training a predictive model using a combination of news alerts and data on clients and transactions as disclosed herein yields better predictions because the relevant circumstances and data are placed in context rather than being considered in isolation. The disclosed approach reduces the time taken (e.g., from days to seconds) and avoids human error. Further, the disclosed approach reveals relevant underlying associations and connections between entities and transactions not feasibly discoverable by human users.

Referring to FIG. 1A, a block diagram of a system 100 is shown. The example system 100 includes a provider computing system 110 (of, e.g., a financial institution), which may be implemented using one or more computing devices. The system 100 also includes third-party devices 170, 174 (of, e.g., news sources), and user devices 180 and 186 (of, e.g., investigators or investigative teams). The components of the system 100 may be communicably and operatively coupled to each other directly or over a network that permits the direct or indirect exchange of data, values, instructions, messages, and the like (represented by double-headed arrows in FIG. 1A). Each system and device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise by sending and receiving transmissions via one or more communications protocols. Wireless interfaces may enable, for example, near-field communication (NFC) between two devices located close to each other (e.g., within four centimeters of each other), and may include other protocols such as Bluetooth, Wi-Fi, and/or wireless broadband. The various components of devices in system 100 may be implemented via hardware (e.g., circuitry), software (e.g., executable code), or any combination thereof. Each system and device in system 100 may moreover include a security client which may provide fraud prevention measures and security protections (such as generation of security tokens, authentication of devices, verification of biometric or other security data, etc.).

The systems and devices in system 100 may also include application programming interface (API) gateways to allow the systems and devices to engage with each other via various APIs, such as APIs that facilitate authentication, data retrieval, etc. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), accounts, dates, functionalities, tasks, etc. In system 100, a system or device may provide various functionality to other systems and devices through APIs by accepting API calls via an API gateway. The API calls may be generated via an API engine of a system or device to, for example, make a request from another system or device.

The provider computing system 110 may include a controller 114 with a processor and memory with instructions executed by the processor to control operations and functionality of the provider computing system 110 and components thereof. User interfaces 118 may include input/output (I/O) components may allow a user to provide inputs (e.g., a touchscreen, stylus, force sensor for sensing pressure on a display screen, etc.) and provide perceptible outputs (e.g., displays and light sources for visually-perceptible elements, a speaker for audible elements, and haptics for perceptible signaling via touch). User interfaces 118 may include biometric sensors such as fingerprint readers, heart monitors that detect cardiovascular signals, iris scanners, face scanners, and so forth. User interfaces 118 may also include ambient sensors that detect surrounding conditions, such as ambient sights and sounds, and may include cameras, imagers, or other light detectors, and microphones or other sound detectors. User interfaces 118 may also include location and orientation sensors, such as a GPS device, gyroscope, digital compass, accelerometer, etc. Provider computing system 110 may also run one or more applications 122 that allow users to interact with system 110 and input selections for various functionalities. Provider computing system 110 may also include a machine learning platform 126 for training various models using machine learning techniques for application to the data.

A real-time alert monitor 130 scans news alerts in real-time or near real-time. The alert monitor 130 may acquire news alerts through third-party devices 170, 174. Alert monitor 130 may use, for example, a "WebCrawler" and/or a "Google API" (and/or other APIs) to access and retrieve news alerts available through the internet. Alert monitor 130 may use any combination of publicly available and proprietary or subscription news alerts. Topic extractor 134 may analyze the news alerts to identify a subset of alerts that relate to crimes or suspicious activities, and/or otherwise satisfy one or more criteria of interest. For example, topic extractor 134 may flag news alerts related to a crime being committed or investigated by law enforcement. An entity extractor and resolver 138 may determine whether any persons or organizations named in an alert, or any persons or organizations related to (but not named in) the alert, are clients of the provider (e.g., an account holder or other customer of the financial institution that is implementing the provider computing system 110). The clients may be identified through, for example, data in a client database 154 and/or transaction database 158, which may include account information and personal information regarding clients of the provider.

An enrichment module 142 may generate an enriched alert comprising a news alert along with other data. For example, the enrichment module 142 may retrieve data about the client from the client database 154, as well as data on transactions in which the client is involved from the transaction database 158. The enrichment module 142 may enrich the news alert with personal information about the client, transactions in which the client was engaged or involved (e.g., recent purchases of items relevant to the news alert, such as items that may have been used in the commission of a crime), relationship data (e.g., how the client is related to other entities, such as family members and employees), past suspicious activity reports, information on completed or ongoing investigations that may be relevant, risk overviews, and/or other relevant "risk of customer" data.

In some embodiments, as part of enrichment, words or phrases in a news alert may be tagged with information (e.g., as a sort of annotation) or linked to information (e.g., a hyperlink pointing to data in database 154) that is deemed relevant. Alternatively or additionally, words or phrases in, or audio and/or video segments of, audiovisual news alerts may similarly be tagged with or linked to relevant information. News alerts may alternatively or additionally be enriched through, for example, summarization (e.g., synthesis of key details and events) and extraction (e.g., selection and aggregation of portions deemed most relevant).

A SAR engine 146 may apply predictive machine learning models to determine whether the enriched alert is deemed to warrant further investigation. A news alert, although related to certain crimes or suspicious activities, and although associated with a client, may not be deemed to be of interest to investigators based on the available data. For example, a news alert may lead to identification of a certain client, but the client may have engaged in only routine and explicable transactions. An alert router 150, based on a prediction that the enriched alert may be of interest and/or that a case is a high-priority case, may then identify a destination device to which the enriched alert should be transmitted. For example, the alert router 150 may determine that a user device 180 (of, e.g., a "special" investigations team) is a suitable destination device for the enriched alert based on a determination that a case is a significant (e.g., "high stakes") and high-priority matter. Similarly, the alert router 150 may determine that a user device 186 (of, e.g., a "regular" investigations team) is the suitable destination device for the enriched alert based on a determination that, although further review is warranted, a case is deemed to be lower priority and/or lower stakes.

User devices 180 and 186 include user interfaces 182 and 188, respectively, to allow users to interact with the devices. I/O components may allow a user to provide inputs and provide perceptible outputs, and may include biometric, ambient, location, and orientation sensors, as discussed herein. User devices 180 and 186 also run applications 184 and 190, respectively, that provide users with certain functionalities, tools, selections, etc. In some embodiments, user device 180 and/or user device 186 is a part of the provider computing system 110.

Figure 1B:
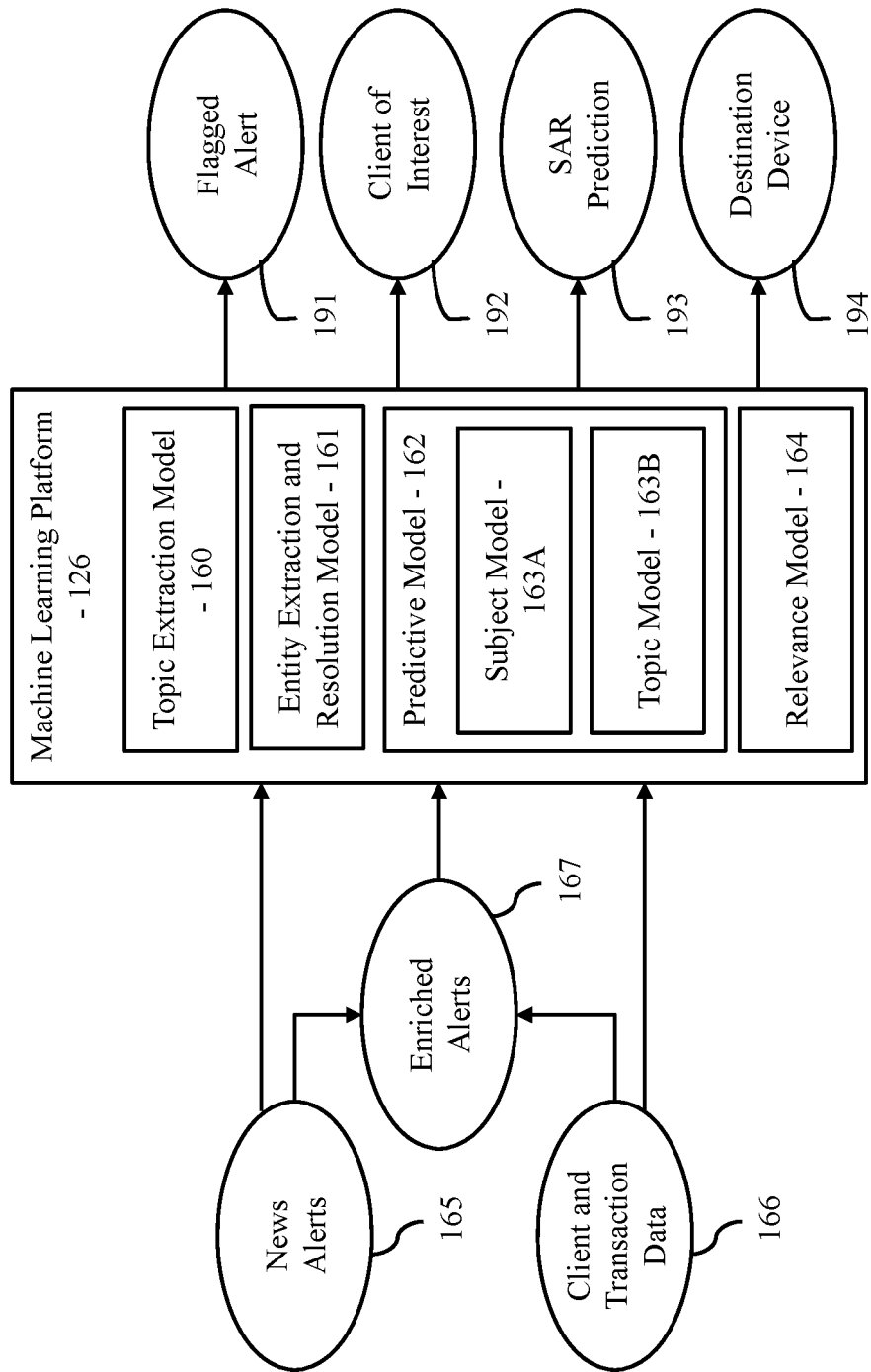
FIG. 1B is a block diagram of the machine learning platform of FIG. 1A and example inputs and outputs thereof, according to potential embodiments.

Referring to FIG. 1B, the machine learning platform 126 and inputs and outputs thereof is depicted, according to potential embodiments. The machine learning platform 126 may potentially comprise, for example, a topic extraction model 160, an entity extraction and resolution model 161, a predictive model 162 (which may include a subject model 163A and/or a topic model 163B), and/or a relevance model 164. The machine learning platform 126 may receive as inputs news alerts 165, client and transaction data 166, and enriched alerts 167, and may output selected enriched alerts 168. The topic extraction model 160 may be trained, for example, using news alerts 165, and once trained, may be applied (by, e.g., topic extractor 134) to other news alerts to identify flagged alerts 191 (e.g., alerts deemed significant). The entity extraction and resolution model 161 may be trained, for example, using news alerts 165 and client and transaction data 166, and once trained, may be applied (by, e.g., entity extractor and resolver 138) to other news alerts and client and transaction data to extract relevant persons and organizations and identify clients 192. The predictive model 162 may be trained, for example, using enriched alerts 167, and once trained, may be applied (by, e.g., SAR engine 146) to enriched alerts to determine a SAR prediction 193 (e.g., likelihood of triggering a suspicious activity report). And the relevance model 164 may be trained, for example, using enriched alerts 167, and once trained, may be applied to enriched alerts (by, e.g., alert router 150) to identify suitable destination devices 194.

It is noted that, in various embodiments, the functions performed by the systems, devices, and components depicted in FIGS. 1A and 1B may be performed by a greater number of components or fewer components, and may be performed by other combinations of devices and systems. For example, the functions performed by one component as depicted may instead be performed by two or more components, and/or the functions performed by two or more components as depicted may instead be performed by one component. Similarly, functions may be redistributed among components, devices, and systems. For example, the functions performed by one device or system as depicted may instead be performed by other devices and/or systems, and/or the functions performed by two or more devices or systems as depicted may instead be performed by one device or system.

Figure 2:
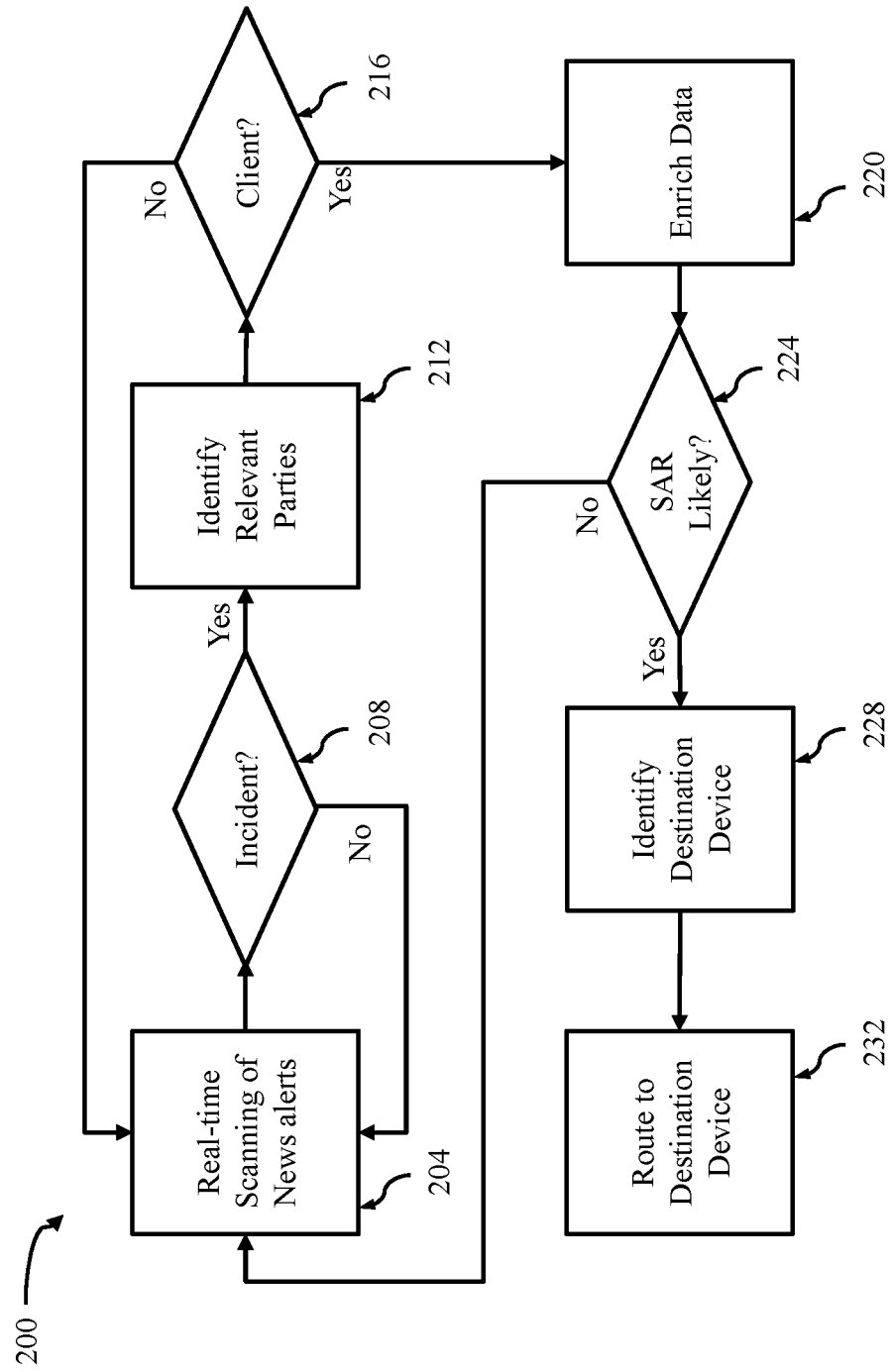
FIG. 2 is a flow diagram of an example process for identifying relevant persons or organizations so as to generate and transmit enhanced news alerts to suitable destination devices, according to potential embodiments.

FIG. 2 depicts an example process 200 involving provider computing system 110, according to potential embodiments. At 204, the provider computing system 110 performs real-time or near real-time scanning of news alerts. This may be performed by, for example, real-time alert monitor 130. At 208, the provider computing system 110 may determine whether any news alerts satisfy a criterion. For example, a news alert may report on a commission of a crime, such as an ongoing car chase or standoff with police officers. In some embodiments, this may be performed by a topic extractor 134 using a topic extraction model 160 that is trained, through one or more machine learning techniques discussed herein, to determine an alert's subject matter and/or whether the subject matter satisfies one or more criteria. Application of the topic extraction model may comprise, for example, use of NLP to identify one or more topics. A set of words or phrases found in past news alerts deemed relevant may be used as training data to train, via supervised or unsupervised learning, the topic extraction model to recognize news alerts being monitored. If such an incident is not identified in news alerts, process 200 may return to scanning at 204.

If, at 208, such an incident is identified, process 200 may proceed to 208, in which an entity extraction model is applied to the news alerts to identify ("extract") persons of interest. In some embodiments, an entity extraction and resolution model 161 may be applied by an entity extractor and resolver 138. Application of the entity extraction model may comprise, for example, use of NLP to identify relevant persons and organizations. Certain relevant parties may be specifically identified in the news alert, such as when an alert names a person or organization suspected of committing a crime or being under investigation. Certain relevant parties may not be explicitly named, but may be associated with named entities. For example, a family member, employer, employee, co-owner, co-worker, social-networking "friend" or colleague, or other entity may be identified by accessing certain internal databases and/or third-party devices (e.g., government devices with public records, credit agencies devices, social networking computing systems, etc.).

At 216, provider computing system 110 may determine whether any persons of interest are clients, or whether there is otherwise any data about any persons of interest available in the client database 154 and/or transaction database 158. In some embodiments, this may be performed by an entity resolution model using the entity extractor and resolver 138. If not, process 200 may return to scanning of news alerts at 204. In some embodiments, the provider computing system 110 may determine whether any subsequent news alerts may be related to the flagged alert or may otherwise include additional information on the relevant incident. Additional details found in a subsequent news alert may reveal, for example, a previously unknown relationship between the person of interest and another entity which is a client.

If the person of interest is identified as being a client at 216, risk data about the client may be used to enrich the news alert at 220. This may be performed by the enrichment module 142, which may retrieve data on the client from the client database 154, and data on financial transactions involving the client from the transaction database 158. In some embodiments, enriched alerts may have a standard format, which may be useful, for example, for training of the predictive model. For example, in various sections and particular formats, the enriched alert may include or identify: certain keywords or phrases describing an incident; how the identified client is related to the incident (e.g., suspect, merchant selling goods to the client, etc.); relationships of the client with persons and organizations named in the flagged alert (e.g., parent-child, siblings, employer-employee, supplier, etc.); relationships of the client with persons or organizations not named but otherwise associated with named individuals; types and amounts of transactions; information on source of certain data; etc.

In some embodiments, if no person or organization is named, persons and organizations may be identified in other ways, such as by using a reported or detected location of an incident (e.g., at a particular merchant or house) via, for example, one or more GPS devices, recognition of landmarks in images in news alerts, etc. For example, if it is determined that a client used a credit card at a merchant around the start of a standoff, when the standoff is currently occurring at or near that merchant, and/or at or near a residence of the card holder or a related person or organization, the credit card holder and transaction may warrant, or be relevant to, an investigation.

At 224, the enriched alert is then fed to a predictive model to determine the likelihood that, when the news alert is considered in light of the client, financial, or other data with which the news alert has been enhanced, the enriched alert would trigger a suspicious activity report or an investigation. This may be performed by SAR engine 146 using predictive model 162. The predictive model 162 may be trained through one or more machine learning techniques discussed herein to generate a probability or prediction. Data from prior suspicious activity reports and/or prior enriched alerts may be used as training data to train, via supervised or unsupervised learning, the predictive model to determine probabilities and/or predictions. For example, in some embodiments, prior enriched alerts, labeled with determinations as to whether a suspicious activity report was triggered for each enriched alert, may be used to train the predictive model using supervised machine learning techniques.

If no suspicious activity report is likely at 224, process 200 may return to scanning of news alerts at 204. In some embodiments, the provider computing system 110 may determine whether any subsequent news alerts may be useful for generation of a revised or new enriched alert that includes more relevant data and yields an updated prediction at 224 that is different from a prior prediction.

If a suspicious activity report is likely at 224, process 200 proceeds to 228, at which the enriched alert is fed to a relevance model to identify a user device to which the enriched alert should be transmitted. This may be performed by alert router 150 using relevance model 164. The relevance model 164 may be trained through one or more machine learning techniques discussed herein to generate a destination device. Data from prior suspicious activity reports and/or prior enriched alerts may be used as training data to train, via supervised or unsupervised learning, the relevance model to identify user devices of proper investigators. For example, in some embodiments, prior enriched alerts, labeled with determinations of which destination devices the enriched alert were properly transmitted to, may be used to train the relevance model using supervised machine learning techniques. At 232, the enriched alert (and/or other relevant case data) is transmitted to the identified destination device (e.g., user device 180 and/or user device 190) over a network via one or more network interfaces.

Figure 3:
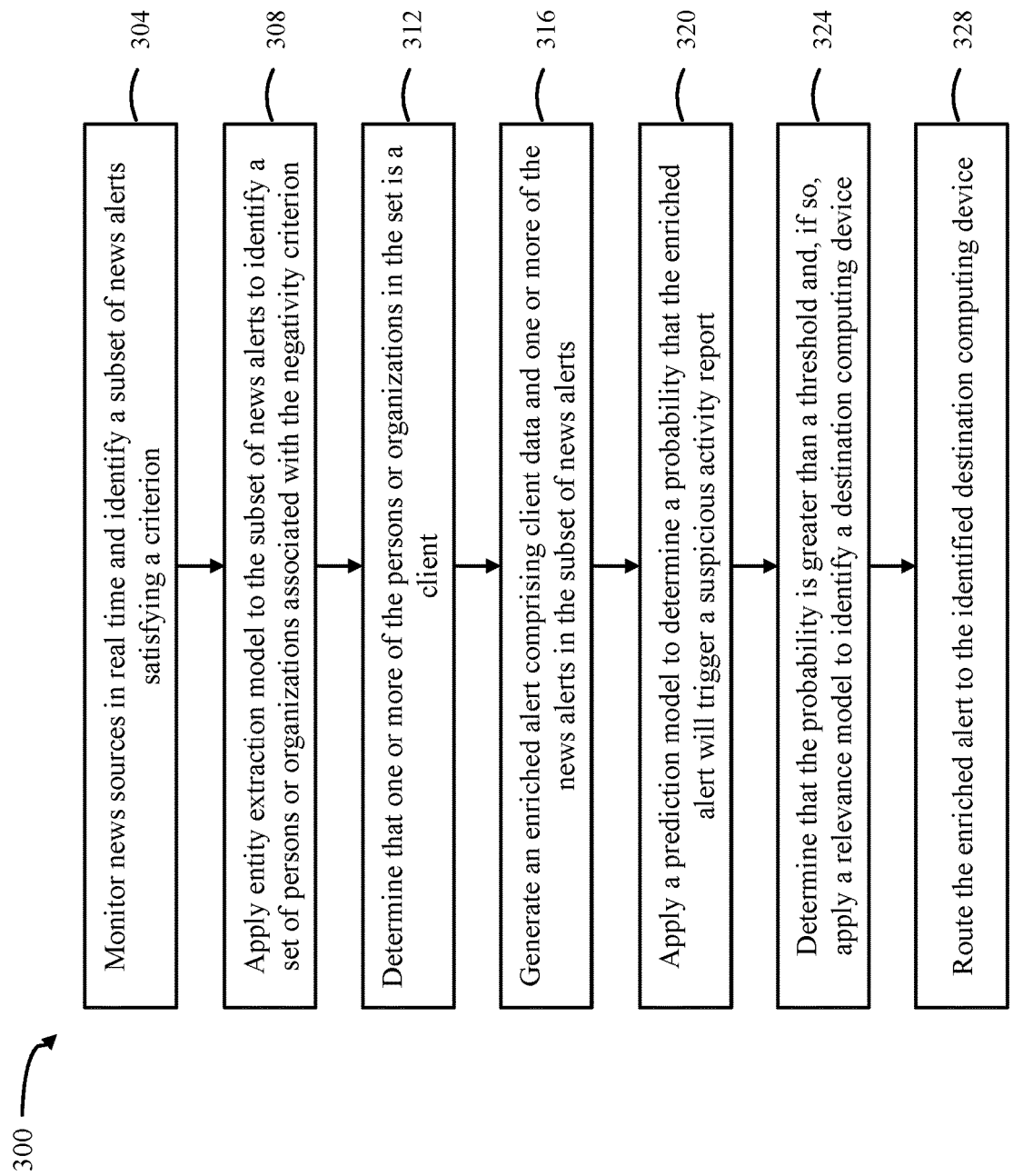
FIG. 3 is a flow diagram of an example process for identifying clients through monitoring of news alerts, according to potential embodiments.

FIG. 3 depicts an example process 300 involving provider computing system 110, according to potential embodiments. At 304, the provider computing system 110 detects an incident or event of interest. The provider computing system 110 may detect the incident or event of interest by monitoring news sources (e.g., third-party devices 170 and 174). The news sources may be monitored via alert monitor 130. The provider computing system 110 may identify a subset of the monitored news alerts that satisfy a criterion, such as commission of a crime or a suspicious activity. The subset of the monitored news alerts may be identified through application, by the topic extractor 134, of a topic extraction model. The news sources may be monitored in real-time or near real-time such that process 300 may be implemented upon detection of the relevant crime, incident, or event.

At 308, the provider computing system 110 may apply an entity extraction model to the subset of news alerts to identify a set of persons or organizations associated with the incident or event of interest. The entity resolution model may be applied by the entity extractor and resolver 138. At 312, the provider computing system 110 may identify one or more of the persons or organizations in the set as being a client. This may be performed via an entity resolution model. The client or clients may also be identified by the entity extractor and resolver 138. At 316, the provider computing system 110 may enhance the news alert to generate an enriched alert comprising client data and one or more of the news alerts in the subset of news alerts. The enriched alert may be generated via the enrichment module 142.

At 320, the provider computing system, via the SAR engine 146, may apply a predictive model to the enriched alert. The predictive model may determine a probability that the enriched alert will trigger a suspicious activity report, or may make a prediction (e.g., yes or no) regarding whether the enriched alert will trigger a suspicious activity report. At 324, the provider computing system 110, via the SAR engine 146, may determine whether the probability is greater than a threshold (e.g., greater than 50%, 70%, or 90%). If the probability is greater than the threshold, or the predictive model predicted that a suspicious activity report is likely to be triggered (e.g., the predictive model output a "yes"), the provider computing system 110 may apply a relevance model to identify a destination computing device. The relevance model may be applied by the alert router 150. At 328, the provider computing system may transmit the enriched alert to the identified destination computing device. For example, the alert router 150 may transmit the enriched alert to user device 180 and/or user device 190.

Figure 4:
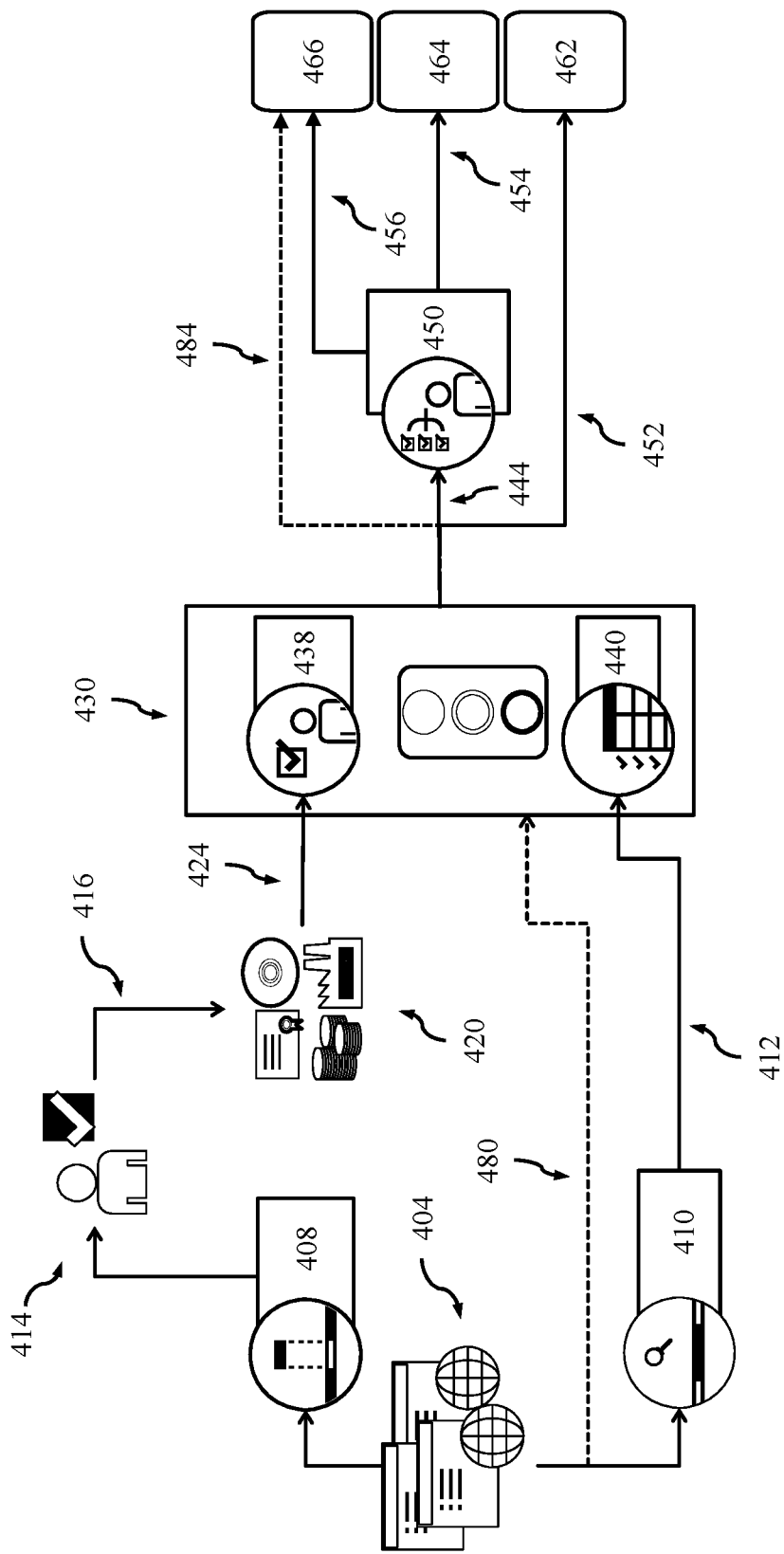
FIG. 4 depicts an example modeling approach to generating enriched alerts and determining whether, and where, to transmit the enriched reports, according to potential embodiments.

FIG. 4 depicts an example approach to monitoring news alerts and determining whether, or to which devices, they should be transmitted, according to potential embodiments. News alerts 404 may be monitored and/or retrieved (e.g., via alert monitor 130) through various news sources, such third-party devices accessible via the internet. An entity extraction model 408 may be applied (e.g., via entity extractor and resolver 138) to the news alerts, or a subset thereof, to identify relevant entities. Application of the entity extraction model 408 may comprise, for example, application of natural language processing models, use of neural networks, and/or implementation of one or more other machine learning tools. Similarly, a topic extraction model 410 may be applied (e.g., via topic extractor 134) to the news alerts, or a subset thereof, to determine what topics are covered by or discussed in (e.g., the subject matter of) the news alerts. Application of the topic extraction model 410 may comprise, for example, application of natural language processing models, use of neural networks, and/or implementation of one or more other machine learning tools. The topic extraction model 410 may output, for example, topics and probabilities 412 that one or more extracted topics are topics of interest to investigators.

The entities (e.g., persons and organizations) may be explicitly named but need not be named, and instead may be identified based on geographical locations, activities, persons, organizations, or other circumstances that are explicitly or implicitly discussed or otherwise detected via the news alerts. In an example, a news alert may report on an active shooter situation, and through analysis of the text, audio, video, imagery, etc., certain features (e.g., weapons, clothing, demographic or other characteristics, geographic landmarks, noise signatures, etc.) may be detected (e.g., via image analysis using image processing techniques, facial recognition, GPS data, analysis of recorded audio, etc.) and linked to certain persons or entities for which data (e.g., personally identifiable data and/or data on financial transactions potentially warranting investigation) is available (e.g., in internal databases and/or from third-party devices).

Once the entities have been extracted from a news alert, entity resolution 414 may be performed (e.g., via entity extractor and resolver 138) to determine whether any of extracted persons or organizations are customers of the financial institution. Entity resolution may comprise, for example, application of natural language processing models, use of neural networks, and/or implementation of one or more other machine learning tools. Entity resolution 414 may be based on names or other details provided by, or derived and/or inferred from, one or more news alerts. This may use, for example, data in client database 154 and/or data accessible through third-party devices 170, 174 (to, e.g., distinguish between persons with the same or similar names). In some embodiments, entity resolution 414 may alternatively or additionally determine whether any data (e.g., financial transactions in transaction database 158 and/or accessible via third-party devices 170, 174) are available on any extracted entities, regardless of whether any of the extracted entities are or have been customers of the financial institution. For example, one or more extracted entities may have engaged in one or more relevant financial transactions with a customer of the financial institution, or otherwise via (e.g., processed through) the financial institution.

If the probability that an extracted entity is a customer (or otherwise is an entity on which financial data is available) is sufficiently high at 416 (e.g., is greater than a threshold probability, such as 80% or 95% likelihood of a match), then the news alert(s) from which the relevant entities were extracted undergo data enrichment at 420 (via, e.g., enrichment module 142) to generate one or more enriched alerts 424. The enriched alerts 424 may be fed to predictive model 430. Application of the predictive model 428 (via, e.g., SAR engine 146) may evaluate or determine a probability that the news alert would trigger a suspicious activity report following an investigation, or otherwise warrants further investigation. In various embodiments, the enriched alert 424 may be fed to a subject model 438 of the predictive model that may evaluate, for example, based on the events and circumstances in combination with risk data, whether a suspicious activity report is sufficiently likely (e.g., a SAR probability of at least 35%, 50%, or 75%) or otherwise that an investigation is warranted.

The predictive model 430 may also receive data from topic extraction model 410, such as extracted topics and probabilities that the extracted topics are the actual topics (e.g., confidence in the topics as measured using a confidence score that is output by the topic extraction model 410). In the case of 480, further discussed below, the probability may be set to 100% (or otherwise sufficiently high) if topic extraction is skipped or otherwise limited. In various embodiments, the topics and probabilities 412 may be fed to a topic model 440 of the predictive model 430. The topic model may evaluate the importance or significance of the topics of the news alerts and generate a significance metric that corresponds to, for example, a measurement of significance of the topics to suspicious activity reports. In various embodiments, the predictive model 430 provides output 444, which may comprise, for example, output topics and probabilities 412, enriched alert 424, a significance metric 444, and/or a SAR probability.

In various embodiments, the output 444 may be fed to a relevance model 450. Application of the relevance model 450 (via, e.g., alert router 150) to output 444 may indicate which destination device the case (e.g., the enriched alert 424 and/or other components of output 444) is to be transmitted via a network. In certain embodiments, if the SAR probability is below a SAR threshold (e.g., below 30% or below 50%), at 452 it may be deemed (via the relevance model 450, or directly via the predictive model 430 and bypassing the relevance model 450) that no case is detected, and the data may potentially be transmitted to a non-investigative destination device 462 for further review and confirmation that there is no case. In various embodiments, if the relevance model 450 determines, at 454, that the SAR probability is greater than the SAR threshold, but the significance metric 444 is below a significance threshold, the relevance model 450 may transmit the case to a "regular" investigations destination device 464. In other embodiments, if the relevance model 450 determines, at 456, that the SAR probability is at least as high as the SAR threshold and the significance metric 444 is at least as high as the significance threshold, the relevance model 450 may transmit the case to a "special" investigations destination device 466.

In various embodiments, the topic extraction model 410 and/or the topic model 440 may be optional. For example, all news alerts (or all news alerts from one or more particular sources, or one or more news alerts which keywords in their titles, etc.) may be considered for investigation (e.g., via entity extraction and resolution, alert enrichment, prediction modeling, and automated case routing). News alerts may be considered for investigation depending on, for example, the entities identified via the news alerts and whether the relevant associations or financial transactions of the identified entities are sufficiently likely to trigger a suspicious activity report or otherwise warrant investigation.

In FIG. 4, for example, a news alert may bypass the topic extraction model at 480. One or more topics provided by third-party device 170, 174, or topics otherwise accompanying or associated with the news alerts, may be fed to the predictive model 430. The predictive model 430 may be provided with, for example, an indication that a particular topic is of interest (e.g., an assumption of a probability of 100% that the topic is correct and/or relevant). In some embodiments, topics of news alerts may be extracted (e.g., for potential review and easier understanding of the context or relevance of the circumstances and events related to the news alerts), but not fed to a topic model to attain a measure (e.g., significance metric) of their importance or priority. In some embodiments, the predictive model 430 thus lacks the topic model 440, and application of the predictive model 430 is application of the subject model 438. At 484, the significance metric 444 may be adjusted or set to be 100%, or otherwise at least as high as the significance threshold, and consequently, if the SAR probability is at least as high as the SAR threshold, the case may be transmitted to the special investigations destination device 466.

Figure 5:
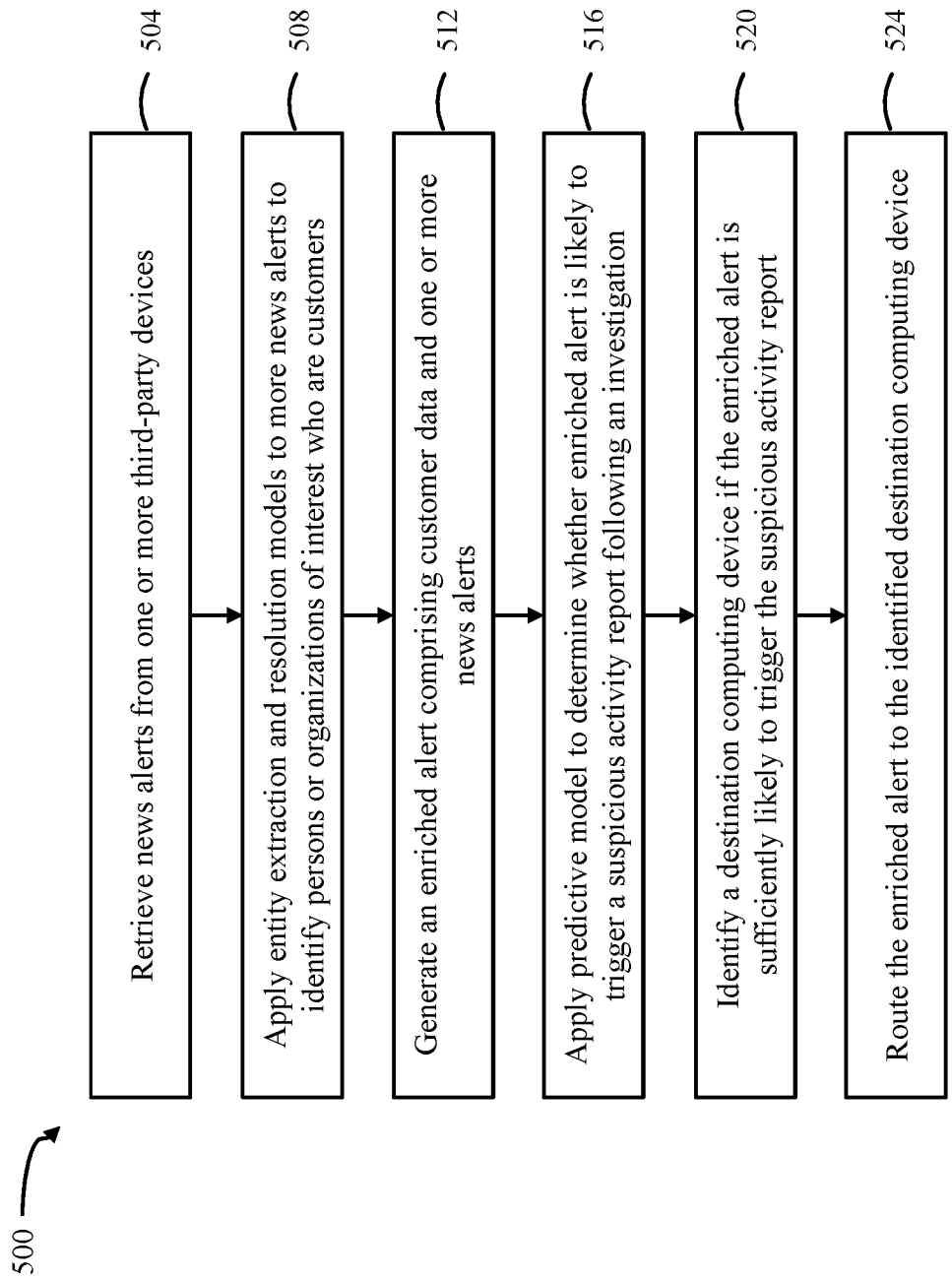
FIG. 5 is a flow diagram of an example process for identifying customers in particular news alerts deemed significant, according to potential embodiments.

FIG. 5 depicts an example process 500 involving a computing system 110 of a financial institution, according to potential embodiments. At 504, the computing system 110 retrieves (e.g., via alert monitor 130) one or more news alerts from one or more third-party devices 170, 174 of news sources. At 508, the computing system 110 (e.g., via entity extractor and resolver 138) may apply an entity extraction model to one or more of the news alerts to identify persons or organizations of interest, and an entity resolution model to determine which persons or organizations are customers of the financial institution. In various embodiments, application of the entity resolution model may comprise application of an entity extraction model, or vice-versa, to detect (via, e.g., natural language processing models) relevant entities named in or otherwise related to the circumstances or events of the news alert, and to determine whether any of the detected entities are customers (or whether any relevant data, such as data on financial transactions involving detected entities, is accessible to computing system 110). In various embodiments, entity extraction and/or resolution may be performed via one model or more than one model.

At 512, if a customer is involved (or otherwise if the computing system 110 has access to relevant data), computing system 110 (via, e.g., enrichment module 142) generates an enriched alert. The enriched alert may comprise, for example, customer data, data on financial transactions involving one of the entities detected via the entity extraction model, prior suspicious activity reports, etc. At 516, the computing system 110 may apply a predictive model (via, e.g., SAR engine 146) to the enriched alert to determine whether the relevant circumstances and/or entities are likely to trigger a suspicious activity report and generate a SAR probability or SAR prediction. At 520, if the SAR probability is greater than a threshold (and/or the SAR prediction is "yes" or otherwise affirmative), the computing device 110 may (via, e.g., alert router 150) identify a destination computing device to which the enriched alert should be transmitted, and at 524, may transmit the enriched alert to the identified destination device.

Figure 6:
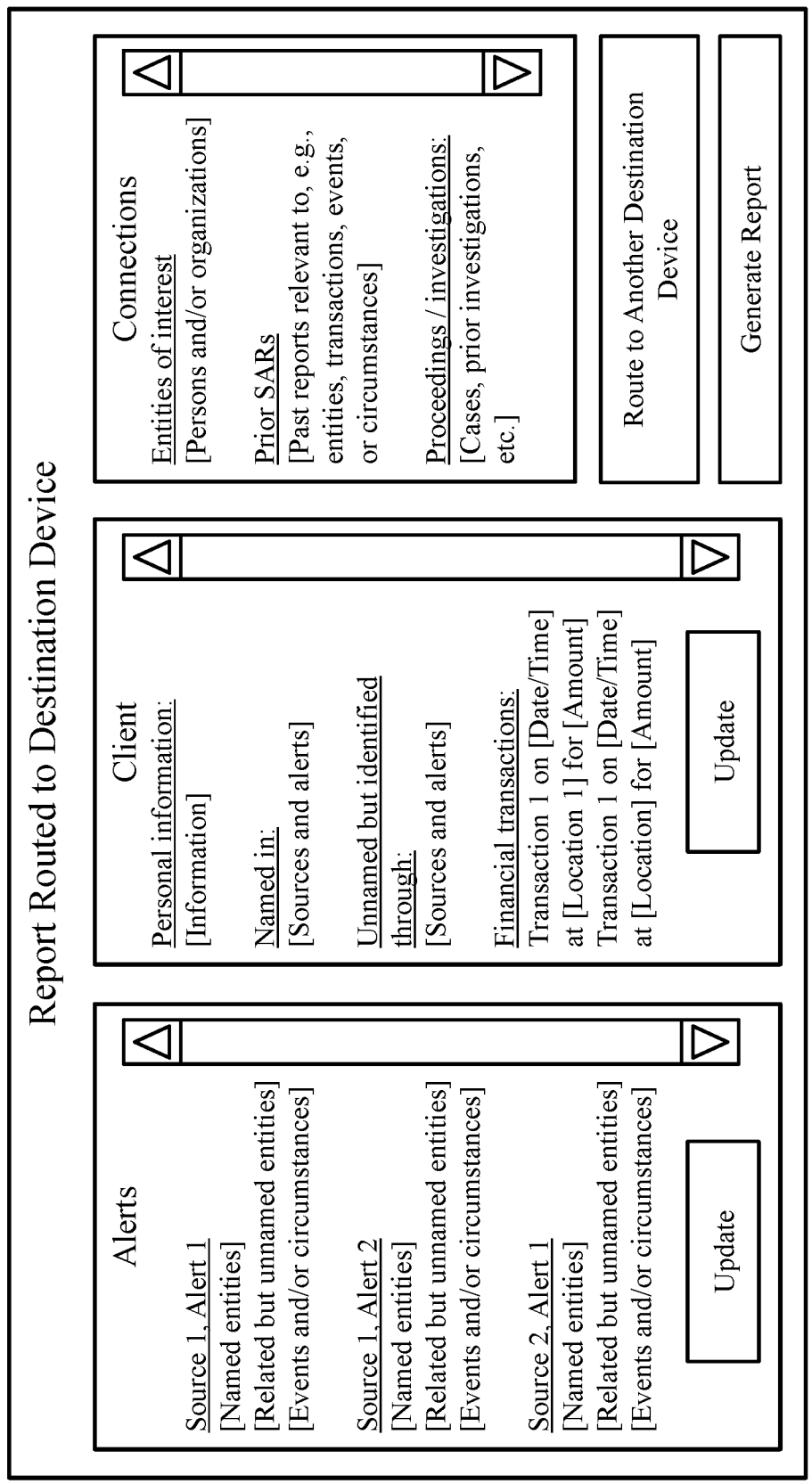
FIG. 6 is an example user interface with a report transmitted to a destination device, according to potential embodiments.

FIG. 6 provides an example graphical user interface 600 with a generated report, according to example embodiments. Interface 600 may be displayed on a display screen (e.g., one of the user interfaces 182 or 188) of a user device 180 or 186 that is a destination device to which a report is transmitted by, for example, alert router 150. Interface 600 includes an example "Alerts" section identifying relevant alerts by source, such as Source 1, Alert 1 and Source 2, Alert 1. For each alert, the entities (e.g., persons and/or organizations) named in the alert may be identified, as well as entities not explicitly named but otherwise identified (e.g., by entity extractor and resolver 138) as being related to named entities or related to events, circumstances, geographic locations, etc. An identification, summary, or overview of the events and/or circumstances described in the alert may also be provided. The events and/or circumstances displayed may include, for example, all of the text in the alert, or may provide excerpts deemed relevant and/or a synthesis of the information in the alert. An update selector (which may be activated, e.g., by touching the selector on a touchscreen or selecting the update selector using another input device) allows the user to choose to have the list of alerts updated to include, for example, any subsequent alerts detected through, for example, real-time alert monitor 130. In some embodiments, the information may be automatically refreshed in real-time or near real-time, or periodically (e.g., every minute or every 15 seconds), in which case if an update selector is also provided, it would be provided to allow the user to manually initiate a refresh prior to the next auto-refresh. A scroll mechanism (i.e., the bar with the triangles at opposing ends) allows the user to scroll the screen to show additional elements that may not fit on one screen.

Interface 600 also includes an example "Client" section with information on one or more clients identified through one or more alerts. A client may have been explicitly named in an alert, or may have been identified in another manner. For example, a client may have been identified by detecting an association or relationship of the client with another person or organization which may have been named in an alert or may have been identified (e.g., through inference or deduction) based on the information (e.g., text, audio, video, imagery, GPS location data, etc.) on events or circumstances in one or more alerts. The Client section may also identify financial transactions involving or related to the client, such as funds transfers, purchases, etc. An update selector allows the user to choose to have the client information updated to include, for example, subsequent financial transactions, newly-identified related entities, and/or updated personal information. In some embodiments, the information may be automatically refreshed in real-time or near real-time, or periodically, in which case if an update selector is provided, it would be provided to allow the user to manually initiate a refresh prior to the next auto-refresh. A scroll mechanism allows the user to scroll the screen to show additional elements that may not fit on one screen.

Interface 600 also includes an example "Connections" section with information on, for example, triggers, relationships, or associations that may be deemed to indicate potentially suspicious events, circumstances, or activities. Examples include entities of interest (e.g., if a transaction in which the client is involved is with a suspect or other person or organization of interest, such as a person or organization that is under investigation or that is known to have committed certain crimes), prior suspicious activity reports deemed relevant to the entities, transactions, or events and circumstances, legal or regulatory proceedings or investigations deemed relevant to the entities, transactions, or events and circumstances, etc.

Interface 600 additionally provides a "Route to Another Destination Device" selector to allow the user to select to have the report transmitted to another user device of, for example, another investigative team. This may be used if, for example, a report deemed "regular" and therefore transmitted to a corresponding destination device is deemed, upon further review, to warrant "special" attention by another user or team, or vice-versa. A "Generate Report" selector may allow the user to initiate, for example, generation and/or transmission of a suspicious activity report, with information unearthed in the process, to, for example, regulatory or law enforcement entities or other specified recipients.

It is noted that any element in interface 600 may be selectable to allow the user to obtain more details, in a pop-up window, in another screen, or otherwise. For example, the user may select a source, an alert, a named or unnamed entity, an identification of events or circumstances, personal information, financial transactions and details thereof, entities of interest, prior suspicious activity reports, proceedings or investigations, etc. for more or related information.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A machine-learning method implemented by a computing system of a financial institution, the method comprising:
   retrieving, by the computing system, one or more news alerts from one or more third-party devices;
   applying, by the computing system, an entity extraction model to the one or more news alerts to identify one or more persons or organizations associated with the one or more news alerts;
   applying, by the computing system, an entity resolution model to determine which of the one or more persons or organizations is a customer of the financial institution;
   identifying, by the computing system, one or more topics of the one or more news alerts associated with the customer;
   generating, by the computing system, an enriched alert comprising customer data and the one or more news alerts or a subset thereof, the enriched alert comprising a list of previous transactions involving the customer and a list of prior enriched alerts generated for the customer;

applying, by the computing system, a predictive model that receives the enriched alert and the one or more topics as input and generates (i) a probability that the enriched alert will trigger a suspicious activity report following an investigation, and (ii) a respective significance score for each of the one or more topics;

responsive to generating the probability, selecting, by the computing system, from a plurality of destination devices, based on the respective significance score for each of the one or more topics and based on the probability, a suitable destination computing device to which to transmit the enriched alert; and transmitting, by the computing system, the enriched alert to the suitable destination computing device for investigation.

2. The method of claim 1, wherein identifying the one or more topics comprises applying, by the computing system, a topic extraction model to the one or more news alerts to identify the one or more topics of the one or more news alerts.

3. The method of claim 2, wherein applying the topic extraction model comprises applying, by the computing system, natural language processing models to the one or more news alerts to identify the one or more topics.

4. The method of claim 2, wherein applying the predictive model comprises determining, by the computing system, that at least one of the one or more topics satisfies a criterion.

5. The method of claim 4, wherein the criterion is commission of a crime.

6. The method of claim 5, wherein the crime is a financial crime.

7. The method of claim 2, wherein applying the predictive model comprises applying, by the computing system, a topic model to the one or more topics to determine the respective significance for each of the one or more topics.

8. The method of claim 7, wherein selecting the suitable destination computing device comprises selecting, by the computing system:

a first computing device if the respective significance score is at least as large as a threshold significance metric; and a second computing device if the respective significance score is smaller than the threshold significance metric.

9. The method of claim 1, wherein retrieving the one or more news alerts comprises monitoring, by the computing system, the one or more third-party devices in real-time for news alerts satisfying a criterion, and acquiring the news alerts that satisfy the criterion.

10. The method of claim 1, wherein applying the entity extraction model produces a first person or organization who is named in the one or more news alerts, and a second person or organization who is not named in the one or more news alerts but who is related to the first person or organization.

11. The method of claim 10, wherein the customer is the first person or organization.

12. The method of claim 10, wherein the customer is the second person or organization.

13. The method of claim 1, wherein applying the predictive model comprises applying, by the computing system, a subject model to the customer data to determine that the customer warrants an investigation based on financial transactions involving the customer.

14. The method of claim 1, wherein the customer data in the enriched alert comprises personally identifying data and financial transactions involving the customer.

15. The method of claim 14, wherein applying the predictive model comprises applying, by the computing system, a subject model to the customer data to determine that financial transactions involving the customer warrant an investigation.

16. The method of claim 1 further comprising training, by the computing system, the predictive model via machine learning using past enhanced alerts for which outcomes are known.

17. A computing system of a financial institution, the computing system comprising a processor and a memory comprising instructions executable by the processor, the instructions comprising a machine learning platform configured to:

retrieve, from one or more third-party devices, one or more news alerts;

apply an entity extraction model to the one or more news alerts to identify one or more persons or organizations associated with the one or more news alerts;

apply an entity resolution model to determine which of the one or more persons or organizations is a customer of the financial institution;

identify one or more topics of the one or more news alerts associated with the customer;

generate an enriched alert comprising customer data and the one or more news alerts or a subset thereof, the enriched alert comprising a list of previous transactions involving the customer and a list of prior enriched alerts generated for the customer;

apply a predictive model that receives the enriched alert and the one or more topics as input and generates (i) a probability that the enriched alert will to trigger a suspicious activity report following an investigation, and (ii) a respective significance score for each of the one or more topics;

responsive to generating the probability, select, from a plurality of destination devices, based on the respective significance score for each of the one or more topics and based on the probability, a suitable destination computing device to which to transmit the enriched alert; and transmit the enriched alert to the suitable destination computing device for investigation.

18. The system of claim 17, wherein the machine learning platform is further configured to identify the one or more topics by performing operations comprising applying a topic extraction model to the one or more news alerts to identify the one or more topics of the one or more news alerts, wherein applying the topic extraction model comprises applying natural language processing models to the one or more news alerts to identify the one or more topics.

19. The system of claim 18, wherein applying the predictive model comprises applying the topic model to the one or more topics to determine the respective significance score for each of the one or more topics, and wherein selecting the suitable destination computing device comprises selecting a first computing device if the respective significance score is at least as large as a threshold significance metric, and a second computing device if the respective significance score is smaller than the threshold significance metric.

20. The system of claim 19, wherein the machine learning platform is further configured to train the predictive model via machine learning using past enhanced alerts for which outcomes are known.

* * * * *